US007006340B2

(12) United States Patent
Waltenberger

(10) Patent No.: US 7,006,340 B2
(45) Date of Patent: Feb. 28, 2006

(54) CIRCUIT CONFIGURATION FOR PROTECTING A BATTERY AGAINST DEEP DISCHARGE

(75) Inventor: Helmut Waltenberger, Deisenhofen (DE)

(73) Assignee: Infineon Technologies AG, Munich (DE)

( * ) Notice: Subject to any disclaimer, the term of this patent is extended or adjusted under 35 U.S.C. 154(b) by 73 days.

(21) Appl. No.: 10/299,737

(22) Filed: Nov. 19, 2002

(65) Prior Publication Data

US 2003/0076073 A1 Apr. 24, 2003

(30) Foreign Application Priority Data

May 19, 2000 (WO) .................... PCT/DE00/01617

(51) Int. Cl.
*H02H 3/24* (2006.01)
(52) U.S. Cl. ...................................... 361/92
(58) Field of Classification Search ............... 361/92; 320/129, 135, 156
See application file for complete search history.

(56) References Cited

U.S. PATENT DOCUMENTS

| 4,227,191 | A | * | 10/1980 | Raber .......................... 340/628 |
| 4,342,953 | A | * | 8/1982 | Collins ........................ 320/136 |
| 4,423,379 | A | * | 12/1983 | Jacobs et al. ................ 324/429 |
| 4,779,050 | A | * | 10/1988 | Ohnari ........................ 324/426 |
| 4,998,888 | A | * | 3/1991 | Link et al. .................... 439/73 |
| 5,173,653 | A | | 12/1992 | Hochstein |
| 5,890,780 | A | | 4/1999 | Tomiyori |
| 5,966,069 | A | * | 10/1999 | Zmurk et al. .......... 340/636.16 |
| 6,046,574 | A | * | 4/2000 | Baranowski et al. ........ 320/132 |
| 6,052,016 | A | | 4/2000 | Sugiura et al. |
| 6,689,512 | B1 | * | 2/2004 | Kimura et al. .............. 429/185 |

FOREIGN PATENT DOCUMENTS

EP 0 240 883 A2 10/1987

* cited by examiner

*Primary Examiner*—Brian Sircus
*Assistant Examiner*—Zeev Kitov
(74) *Attorney, Agent, or Firm*—Laurence A. Greenberg; Werner H. Stemer; Ralph E. Locher

(57) ABSTRACT

The inventive circuit configuration has only two poles and is connected in series between the battery and the load. The circuit configuration interrupts the electric circuit for a short time in order to gauge the condition of the battery. The interruption is so short that it is not perceived by a user.

14 Claims, 3 Drawing Sheets

CIRCUIT CONFIGURATION FOR PROTECTING A BATTERY AGAINST DEEP DISCHARGE

BACKGROUND OF THE INVENTION

Field of the Invention

The invention relates to a circuit configuration for protecting a battery against deep discharge.

Circuit configurations of this type are already known in diverse configurations. What is common to the known circuit configurations, however, is that they are connected in parallel with the battery in order to be able to tap off the voltage across the battery in order to identify the final discharge condition. In order additionally to enable a disconnection of a load connected to the battery by the circuit configuration even when the final discharge condition is met, the circuit configuration requires at least three terminals. Therefore, apparatus without deep discharge protection can only be retrofitted if they are converted with relatively high outlay. Furthermore, with the previous three-terminal circuit configurations, it is difficult to correspondingly modify existing models being produced.

SUMMARY OF THE INVENTION

It is accordingly an object of the invention to provide a circuit configuration for protecting a battery against deep discharge, which overcomes the above-mentioned disadvantages of the prior art apparatus of this general type.

In particular, it is an object of the invention to provide a circuit configuration for protecting a battery against deep discharge, which allows simple retrofitting of existing apparatus or the adaptation of existing models being produced without requiring a relatively high additional outlay.

With the foregoing and other objects in view there is provided, in accordance with the invention, a circuit configuration for protecting a battery against deep discharge. The circuit configuration includes: two external terminals for connecting to a series connected battery and load; a controllable switch connected between the two external terminals; a series circuit including an energy storage device and a charging device for the energy storage device, the series circuit connected between the two external terminals; and a control circuit connected to the switch. The energy storage device is for supplying the control circuit. The control circuit is for generating a control signal in a manner dependent on a limit value and a voltage across the switch being determined when the switch is open. The control signal causes the switch to be open when the voltage across the switch lies below the limit value. The control signal causes the switch to be open during regularly occurring, short time intervals and otherwise closed when the voltage across the switch lies above the limit value.

The inventive circuit configuration is primarily distinguished by a two-terminal construction that allows a simple connection in series with a battery and a load and can therefore be fixedly installed in most apparatus, or can be installed by the interposition at electrical contacts, without a relatively high outlay. The invention is primarily directed essentially at resistive loads, such as incandescent lamps, for example. The invention is therefore especially suited to flashlights, in the case of which, operation with accumulators is appropriate for economic and/or ecological reasons. This is because well-known flashlight manufacturers expressly recommend that accumulators not be used, since, in the event of not switching off flashlights in good time, the incandescent lamps discharge the accumulators to a point below the discharge limit. However, accumulators subjected to very deep discharge can generally no longer be recharged and are thus no longer useable. With the inventive circuit configuration, flashlights that are already in operation can be retrofitted, for example, by using a small inlay plate, containing the circuit configuration, for the battery compartment. Alternatively, products being manufactured can be easily modified. The flashlights equipped in this way are thus entirely suitable for accumulator operation. Furthermore, operation with conventional primary cells instead of with accumulators is possible in the same way, without restriction.

This is achieved by using a circuit configuration having two external terminals for the connection of a battery and a load connected in series therewith. A controllable switch and a series circuit including an energy storage device and a diode operated in the forward direction is connected between the two external terminals. A control circuit that is supplied from the energy storage device and that is connected to the switch generates a control signal in a manner dependent on a limit value and the voltage across the switch in such a way that: the switch is open in the event of a voltage across the open switch which lies below the limit value; and in the event of a voltage across the open switch which lies above the limit value, is open during regularly occurring, short time intervals, but is otherwise closed.

In a development of the invention, the control circuit has a voltage monitoring circuit for generating a control signal in a manner dependent on the limit value and the voltage across the switch and a pulse generator circuit for generating regularly occurring, momentary pulses, in which case the voltage monitoring circuit and the pulse generator circuit are designed and coupled to the switch in such a way that: the switch is open in the event of a voltage across the open switch which lies below the limit value; and in the event of a voltage across the open switch which lies above the limit value, is open during regularly occurring, short time intervals, but is otherwise closed.

In a preferred embodiment, an auxiliary accumulator (for example polymer accumulator, polymer film battery, etc.) may be provided as the energy storage device and a switching device may be provided as the charging device. The switching device connects the accumulator to the battery for charging purposes, but otherwise isolates the battery and the auxiliary accumulator.

In an alternative embodiment to this, a capacitor is used as the energy storage device and a diode is used as the charging device. In this case, the diode is connected in such a way that the diode is conductive if the voltage across the switch is greater than the voltage across the capacitor, and is otherwise turned off. The voltage across the switch is preferably determined with the interposition of the diode.

In an accordingly preferred embodiment of the inventive circuit configuration, the control circuit has a voltage divider connected in parallel with the capacitor, with a tap. In this case, the controlled path of a first transistor is connected between the control terminal of the switch and a terminal of the capacitor. The controlled path of a second transistor is connected between the control terminal of the first transistor and the other terminal of the capacitor. The control terminal of the second transistor is connected to the tap of the voltage divider. Finally, a resistor is connected between the tap of the voltage divider and the control terminal of the switch. An advantage of this embodiment is that the capacitor is utilized both for the purpose of energy storage for the operation of the entire circuit configuration and as part of a timer for the generation of the pulses. This double utilization of the capacitor means that the size of the circuit configuration is considerably reduced, since capacitors have a comparatively high space requirement.

A third transistor is preferably provided as the switch. Primarily field-effect transistors are suitable since they require only small drive currents, and as a result, the capacitor can be embodied with a lower capacitance, which in turn leads to a smaller space requirement.

If an incandescent lamp with a base (such as in the case of flashlights, for example) is provided as the load, then the circuit configuration can be concomitantly integrated into the base. In this case, the incandescent bulb may be fixedly connected to the base, or alternatively, can be inserted into the base. In this way, incandescent bulbs suitable for accumulators can be produced without a relatively high outlay.

As an alternative, the inventive circuit configuration can also be incorporated into a planar housing with a base area corresponding to the base area of the battery type used. In this case, by way of example, respective contacts may be provided on the end areas, which contacts serve as the two external terminals for the connection of the battery and the load. In this case, the housing, similar to a small plate, may be concomitantly inserted into the battery compartment in series with the battery or batteries, so that apparatus that are already in operation can readily be retrofitted. Finally, the limit value corresponding to the number of battery cells may be fixedly set, may be able to be set externally, or may be embodied in a self-learning manner.

Other features which are considered as characteristic for the invention are set forth in the appended claims.

Although the invention is illustrated and described herein as embodied in a circuit configuration for protecting a battery against deep discharge, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
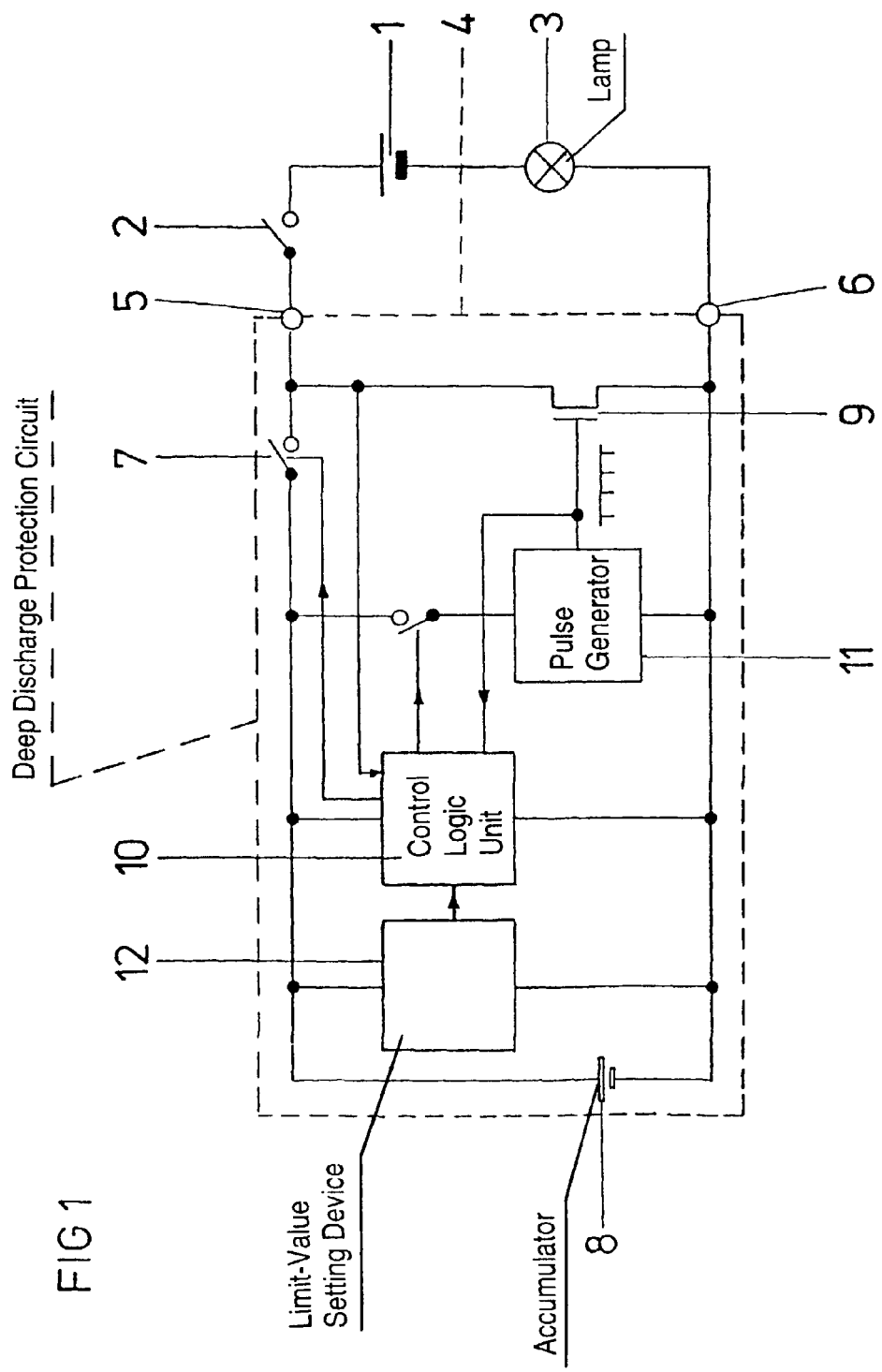
FIG. 1 shows a first embodiment of an inventive circuit configuration.

Referring now to the figures of the drawing in detail and first, particularly, to FIG. 1 thereof, there is shown an exemplary embodiment in which, an incandescent lamp 3 is connected to a battery 1 (e.g. a nickel-cadmium accumulator). An on-off switch 2 and an inventive two-terminal deep discharge protection circuit 4 connected in series with the switch are provided. In this case, the two terminals of the deep discharge protection circuit 4 are formed by terminals 5 and 6, of which, in the exemplary embodiment, terminal 5 is connected to the positive pole of the battery 1 and terminal 6 is connected via the incandescent lamp 3 to the negative pole of the battery 1.

In the case of the deep discharge protection circuit 4, one terminal of a switching device 7 is connected up to the terminal 5, and its other terminal is connected to terminal 6 of the deep discharge protection circuit 4 with the interposition of a polymer accumulator 8 serving as an energy storage device. Furthermore, the drain terminal of an NMOS field-effect transistor 9 serving as controllable switch is connected to the terminal 5. The source terminal of the field-effect transistor 9 is connected to terminal 6. In addition, a control logic unit 10 and a pulse generator 11 are provided, which are both supplied from the polymer accumulator 8. The supply of the pulse generator 11 may be controlled, for the purpose of control and saving energy, by the control logic unit 10 in such a way that the feeding of current to the pulse generator 11 is interrupted in a suitable manner. In this case, the control logic unit 10 monitors the voltage across the drain-source path of the NMOS field-effect transistor 9 and interrupts the feeding of current to the pulse generator 11 when a specific limit value is undershot. The pulse generator 11 is thereby deactivated, as a result of which the NMOS field-effect transistor 9 is completely turned off (the switch is opened). In the exemplary embodiment, the control of the switching device 7 and the determination of the voltage across the NMOS field-effect transistor 9 are effected by the control logic unit 10, which to that end, is connected to the switching device 7 and the terminal 5. In this case, the limit value may be defined by using a fixed resistor, a variable resistor (neither is shown in the drawing), or alternatively by a self-learning circuit.

In the exemplary embodiment, such a self-learning circuit is realized by a limit-value setting device 12, which automatically determines and stores the maximum voltage when new batteries are inserted, and defines the limit value in a manner dependent thereon. The limit value, which is prescribed by the limit-value setting device 12 and which corresponds to the number of battery cells used, is taken by the control logic unit 10 as a basis for a decision as to whether the voltage across the turned-off NMOS field-effect transistor 9 and thus the voltage at the battery 1 exceeds the limit value. In order to interrogate the state of the NMOS field-effect transistor 9, the control logic unit 10 is connected to the output of the pulse generator 11, to which the gate terminal of the NMOS field-effect transistor 9 is also connected. As soon as the pulse generator 11 is activated by the control logic unit 10, the pulse generator supplies, at regular time intervals (e.g. 1 second), short pulses (duration 1 ms for example), during which the NMOS field-effect transistor 9 is turned off. In the exemplary embodiment, to that end, the level at the output of the pulse generator 11 goes to "low" during the pulses, but is otherwise at "high".

At each pulse (low), the control logic unit 10 carries out a voltage comparison between the maximum voltage across switch 9 and the limit value and, leaves the pulse generator 11 activated until the voltage across the NMOS field-effect transistor 9 and thus the battery voltage falls below the limit value at a pulse instant. The pulse generator 11 is thereupon deactivated and the control logic unit 10 changes over to an operating mode with low current consumption. The entire circuit configuration can then be restarted only by switching the battery voltage off using the switch 2, and with a subsequent renewed switching-on or changing of the batteries. In this case, the polymer accumulator 8 can be charged, for example, when new batteries 1 are inserted or whenever the switch 2 is switched on.

In the embodiment shown in FIG. 2, once again the battery 1, the switch 2 connected in series therewith and the series-connected incandescent lamp 3 are connected up to a deep discharge circuit 4'. The deep discharge circuit 4' likewise has two terminals 5 and 6. At the terminal 5, a diode in the forward direction, namely a diode 13, is coupled to the terminal 6 proceeding from the terminal 5 with interposition of a capacitor 14. In this case, the capacitor 14 serves both as an energy storage device and as part of a timer. Finally, the drain-source path of an NMOS field-effect transistor 15 is connected between the terminals 5 and 6.

Connected in parallel with the capacitor 14 is a resistive voltage divider with two resistors 16 and 17, to whose tap the base of a bipolar transistor 18 of the npn type is connected. The emitter of the transistor 18 is in this case connected up to the terminal 6 and the collector of the transistor 18 is connected, with interposition of a resistor 19, to the base of a bipolar transistor 20 of the pnp type. The emitter of the bipolar transistor 20 is connected via the diode 13 to the terminal 5 and the collector of the bipolar transistor 20 is connected via a resistor 21 to the terminal 6. The collector of the bipolar transistor 20 is additionally connected via a feedback resistor 22, which supports a rapid changeover and is preferably embodied with a high resistance, to the base of the bipolar transistor 18 and to the gate terminal of the NMOS field-effect transistor 15. In this configuration, unlike in FIG. 1, a plurality of function blocks are advantageously merged with one another to form a circuit which has few individual elements and in which individual elements such as, for example, the capacitor 14 or the bipolar transistors 18 and 20 perform dual functions.

Figure 2:
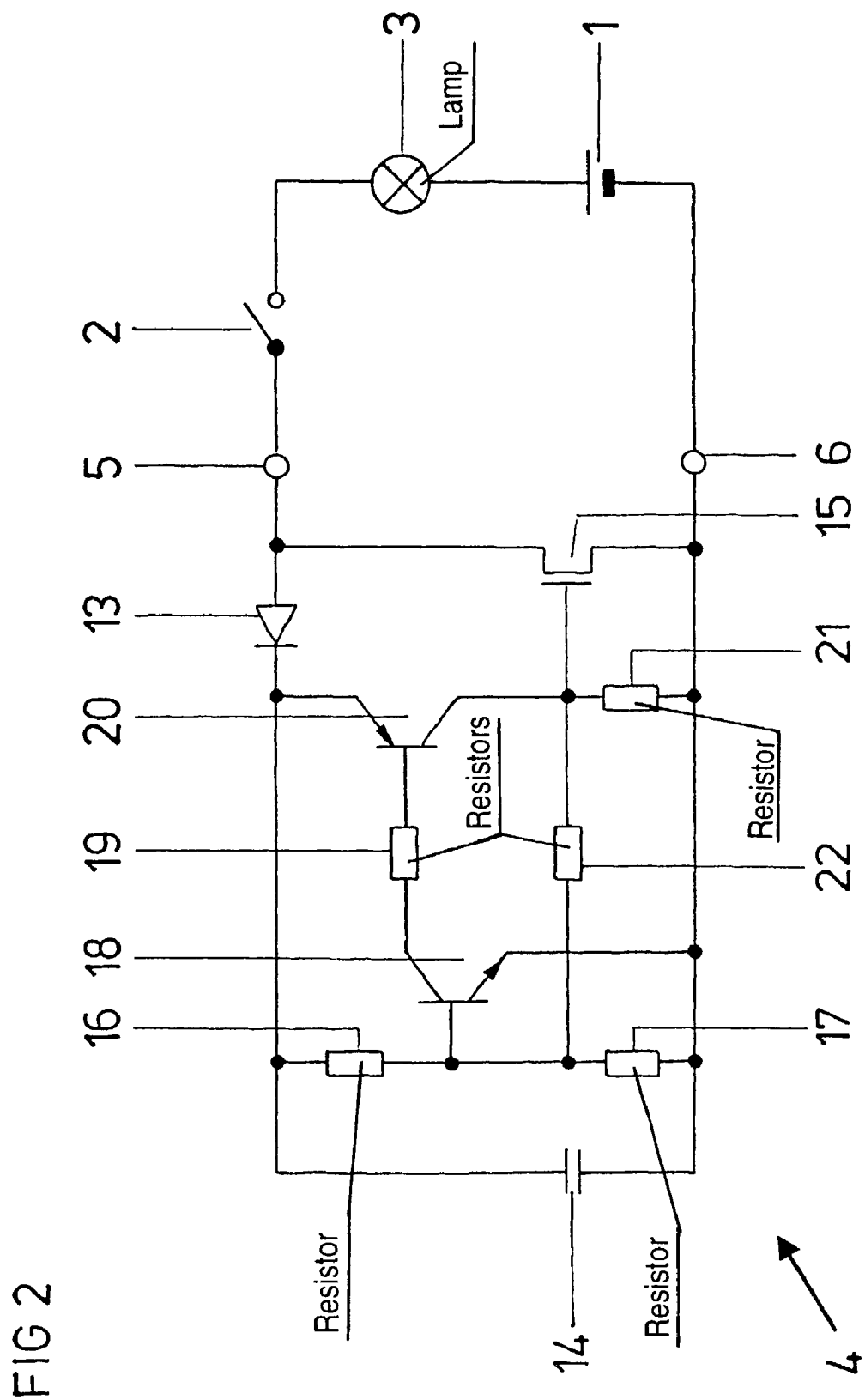
FIG. 2 shows a second embodiment of the inventive circuit configuration.
Figure 3:
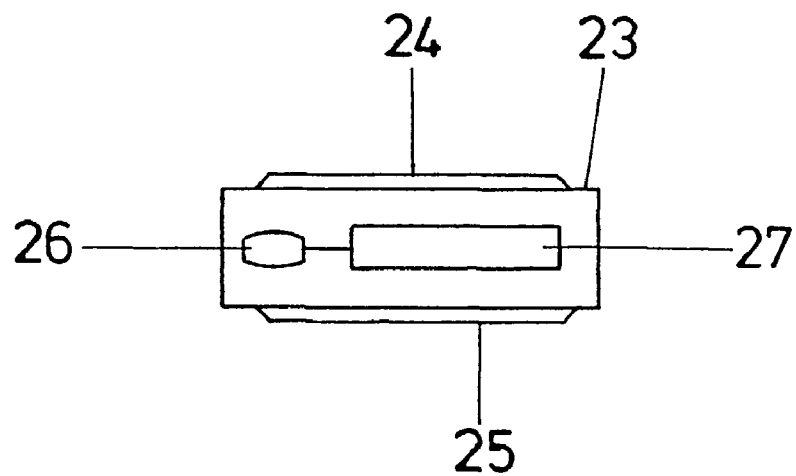
FIG. 3 shows the inventive circuit configuration constructed in a planar housing.

The inventive circuit configuration is preferably incorporated into a small plate-type housing 23 with two contact areas 24 and 25, which, for example, form the terminals 5 and 6 shown in FIGS. 1 and 2, in such a way that, except for a capacitor 26, the circuit configuration is integrated into an integrated circuit 27. In this case, the base area of the housing 23 corresponds to the base area of the battery type used, such as, for example the base area of a Mignon cell, baby cell or monocell. In this case, the small plate is concomitantly inserted into the battery holder and is thus inserted into the electric circuit between the battery and the incandescent lamp.

Figure 4:
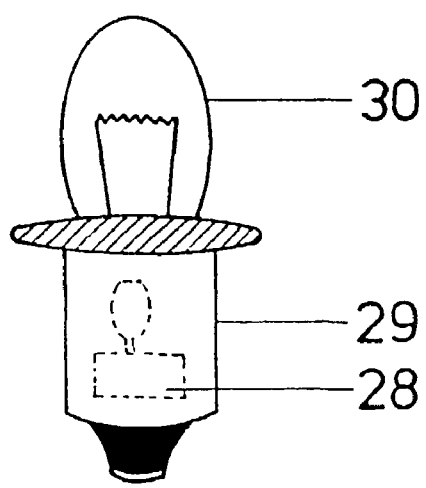
FIG. 4 shows the inventive circuit configuration constructed in a base fixedly connected to an incandescent bulb.
Figure 5:
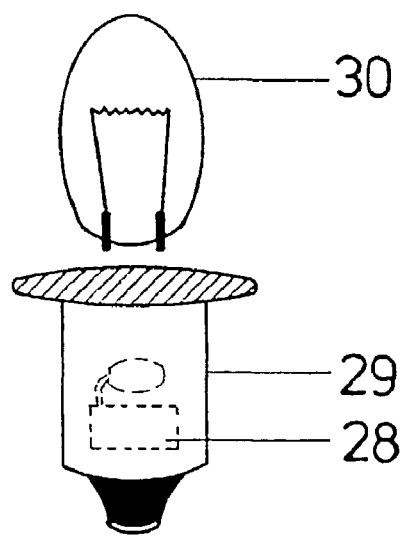
FIG. 5 shows the inventive circuit configuration constructed in a base with a detachable incandescent bulb.

As an alternative, an inventive circuit configuration 28 can also be incorporated into an incandescent lamp base 29, in which case the incandescent lamp base 29 may either be fixedly connected to an evacuated incandescent lamp bulb as shown in FIG. 4, or alternatively, can serve as plug-in holder for the evacuated incandescent lamp bulb 30 as shown in FIG. 5.

The method of operation of the inventive circuit configuration is based on the fact that it is largely current-transmissive with low resistance. As a result, the incandescent lamp is lit with full intensity. At regular intervals (for example 1 second), the circuit configuration interrupts the current flow for a brief moment (for example in the ms range). During this time, the circuit configuration measures the voltage of the battery (of the accumulator) via the incandescent lamp. The measurement itself has a high resistance and is thus scarcely corrupted by the internal resistance of incandescent lamp and battery (accumulator). The circuit configuration according to the invention as shown in FIG. 2 remains in the high-resistance state until the measured voltage corresponds at least to the predetermined limit voltage. Afterward, it turns on again for the predetermined time (e.g. 1 second).

In the case of a sufficient battery voltage, that is to say in the case of a sufficiently charged accumulator, this measurement time (=switch-off time) is so short that the user does not notice anything because of the inertia of the incandescent filament. When the accumulator approaches its discharge limit, the switch-off phases are lengthened in galloping fashion in the case of the circuit configuration shown in FIG. 2 (=the delay until recovery of the accumulator voltage). The user is now made aware of the imminent "end" of the energy reserves by short rhythmic dropouts. If the lamp is nevertheless deliberately left switched on, a "desired" complete discharge of the accumulator is achieved as the length of dark phases continuously increases. Consequently, on top of everything, by way of example, the undesirable memory effect of NiCd accumulators is also prevented.

In the case of the use as a small plate, the inventive circuit configuration could be realized as a small round printed circuit board that is populated with an integrated circuit and a capacitor using SMD technology. With SMD components, it is possible to utilize the free space all around the battery pole of different battery cells (Mignon, baby, mono) and different cell types (e.g. NiCd, NiMH, etc.). In this case, adaptation to the respective battery diameter can be effected by plastic adapter rings into which the small printed circuit board is clipped.

I claim:

1. A circuit configuration for protecting a battery against deep discharge, comprising:
    two external terminals for connecting to a series connected battery and load;
    a controllable switch connected between said two external terminals;
    a series circuit including an energy storage device and a charging device for said energy storage device, said series circuit connected between said two external terminals; and
    a control circuit connected to said controllable switch;
    said energy storage device being for supplying said control circuit;
    said control circuit for generating a control signal in a manner dependent on a limit value and a voltage across said controllable switch being determined when said controllable switch is open;
    said control signal causing said controllable switch to be open when said voltage across said controllable switch lies below said limit value; and
    said control signal causing said controllable switch to be open during regularly occurring, short time intervals and otherwise closed when said voltage across said controllable switch lies above said limit value.

2. The circuit configuration according to claim 1, wherein:
    said control circuit includes a voltage monitoring circuit for generating said control signal, and a pulse generator circuit for generating regularly occurring, momentary pulses;
    said voltage monitoring circuit and said pulse generator circuit are designed and coupled to said controllable switch such that said controllable switch is open when said voltage across said controllable switch is below said limit value; and
    said voltage monitoring circuit and said pulse generator circuit are designed and coupled to said controllable switch such that said controllable switch is open during regularly occurring, short time intervals and otherwise closed when said voltage across said controllable switch is above said limit value.

3. The circuit configuration according to claim 2, in combination with the battery, wherein:
said energy storage device is an auxiliary accumulator;
said charging device is a switching device;
said switching device connects said auxiliary accumulator to the battery for charging purposes, but otherwise isolates the battery and said auxiliary accumulator.

4. The circuit configuration according to claim 2, wherein:
said energy storage device is a capacitor;
said charging device is a diode; and
said diode is connected such that said diode is conductive if said voltage across said controllable switch is greater than a voltage across said capacitor, and said diode is otherwise turned off.

5. The circuit configuration according to claim 1, in combination with the battery, wherein:
said energy storage device is an auxiliary accumulator;
said charging device is a switching device;
said switching device connects said auxiliary accumulator to the battery for charging purposes, but otherwise isolates the battery and said auxiliary accumulator.

6. The circuit configuration according to claim 1, wherein:
said energy storage device is a capacitor;
said charging device is a diode; and
said diode is connected such that said diode is conductive if said voltage across said controllable switch is greater than a voltage across said capacitor, and said diode is otherwise turned off.

7. The circuit configuration according to claim 6, comprising a diode interposed between said controllable switch and said control circuit; said diode used when determining said voltage across said controllable switch.

8. The circuit configuration according to claim 5, wherein:
said circuit includes a voltage divider, a first transistor, a second transistor, and a resistor;
said voltage divider is connected in parallel with a capacitor, said voltage divider has a tap, said capacitor has a first terminal and a second terminal, said controllable switch has a control terminal;
said first transistor has a controlled path connected between said control terminal of said controllable switch and said first terminal of said capacitor, said first transistor has a control terminal;
said second transistor has a controlled path connected between said control terminal of said first transistor and said second terminal of said capacitor, said second transistor has a control terminal connected to said tap of said voltage divider; and
said resistor is connected between said tap of said voltage divider and said control terminal of said controllable switch.

9. The circuit configuration according to claim 1, wherein said controllable switch is a transistor.

10. The circuit configuration according to claim 1, in combination with a base having an incandescent lamp serving as the load; said circuit configuration being integrated into said base.

11. The circuit configuration according to claim 1, in combination with a planar housing having a base area corresponding to a base area of the battery; said circuit configuration being integrated into said housing.

12. The circuit configuration according to claim 1, wherein said limit value can be set externally.

13. The circuit configuration according to claim 1, wherein said limit value is set fixedly.

14. The circuit configuration according to claim 1, comprising: an apparatus for setting said limit value in a self-learning manner.

* * * * *